(12) United States Patent
Sorensen

(10) Patent No.: US 12,520,765 B2
(45) Date of Patent: Jan. 13, 2026

(54) SYSTEMS AND METHODS FOR TOOLLESS CROP DIVIDER ADJUSTMENT

(71) Applicant: CNH Industrial America LLC, New Holland, PA (US)

(72) Inventor: Douglas D. Sorensen, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 643 days.

(21) Appl. No.: 17/922,652

(22) PCT Filed: Apr. 23, 2021

(86) PCT No.: PCT/US2021/028858
§ 371 (c)(1),
(2) Date: Nov. 1, 2022

(87) PCT Pub. No.: WO2021/222023
PCT Pub. Date: Nov. 4, 2021

(65) Prior Publication Data
US 2023/0165193 A1    Jun. 1, 2023

Related U.S. Application Data

(60) Provisional application No. 63/018,662, filed on May 1, 2020.

(51) Int. Cl.
*A01D 63/02*     (2006.01)
*A01D 41/14*     (2006.01)

(52) U.S. Cl.
CPC ........... *A01D 63/02* (2013.01); *A01D 41/142* (2013.01)

(58) Field of Classification Search
CPC .............................. A01D 63/02; A01D 41/142
See application file for complete search history.

(56) References Cited

U.S. PATENT DOCUMENTS 2,632,991 A     3/1953  Schwartz
4,206,914 A *   6/1980  Lee .................... A63B 21/0125
                                                   482/65

(Continued)

FOREIGN PATENT DOCUMENTS

| CN | 107062906 A | * | 8/2017 | ............. F27D 15/02 |
| JP | H10510173 A | * | 10/1998 | ........... A47B 13/023 |
| WO | 2020/262610 A1 | | 12/2020 | |

OTHER PUBLICATIONS

English Translation of CN-107062906-A (Year: 2017).*

(Continued)

*Primary Examiner* — Claude J Brown
(74) *Attorney, Agent, or Firm* — Buchanan Ingersoll & Rooney PC

(57) ABSTRACT

A crop divider includes a housing including an interior cavity and an adjustment assembly disposed within the interior cavity of the housing. In an embodiment, the adjustment assembly is configured to adjust a height of the housing relative to ground. In an embodiment, the adjustment assembly includes an adjustment handle disposed within the interior cavity and a pivot disposed vertically above the adjustment handle within the interior cavity of the housing. In an embodiment, the housing is configured to rotate about an axis through the pivot in response to rotation of the adjustment handle.

18 Claims, 6 Drawing Sheets

(56) References Cited

U.S. PATENT DOCUMENTS

| | | | |
|---|---|---|---|
| 4,616,384 A * | 10/1986 | Lowell | F16M 11/105 |
| | | | 24/502 |
| 4,757,673 A | 7/1988 | Gayman | |
| 9,226,447 B2 | 1/2016 | Noll et al. | |
| 9,253,944 B2 | 2/2016 | Hulstein et al. | |
| 2007/0193242 A1 | 8/2007 | Kost et al. | |
| 2008/0005920 A1* | 1/2008 | DeAnda | A45D 20/00 |
| | | | 34/96 |
| 2011/0107549 A1* | 5/2011 | Crevling, Jr. | A47L 5/225 |
| | | | 15/347 |
| 2019/0230841 A1 | 8/2019 | Walker et al. | |
| 2019/0350124 A1* | 11/2019 | Pitt | A01C 7/208 |
| 2021/0037712 A1* | 2/2021 | Sorensen | A01D 63/04 |

OTHER PUBLICATIONS

English Translation of JP H10-510173 A (Year: 1998).*
International Search Report and Written Opinion for PCT Application No. PCT/US2021/028858 dated Jul. 20, 2021 (12 pages).

* cited by examiner

SYSTEMS AND METHODS FOR TOOLLESS CROP DIVIDER ADJUSTMENT

BACKGROUND

The present disclosure relates generally to a crop divider. More specifically, the present disclosure relates to a toolless system for crop divider adjustment.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a plant from a field using a header of the harvester. The header may cut the crops and may transport the cut crops to a processing system of the harvester.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In some embodiments, a crop divider includes a housing including an interior cavity and an adjustment assembly disposed within the interior cavity of the housing. In an embodiment, the adjustment assembly is configured to adjust a height of the housing relative to ground. In an embodiment, the adjustment assembly includes an adjustment handle disposed within the interior cavity and a pivot disposed vertically above the adjustment handle within the interior cavity of the housing. In an embodiment, the housing is configured to rotate about an axis through the pivot in response to rotation of the adjustment handle.

In some embodiments, a header of a harvester includes a cutter bar assembly configured to cut crops along a field surface and a crop divider configured to funnel crops toward the cutter bar assembly. In an embodiment, the crop divider includes a housing including an interior cavity and an adjustment handle disposed within the interior cavity and configured to rotate relative to the housing. In an embodiment, the crop divider also includes a pivot disposed vertically above the adjustment handle within the interior cavity of the housing, wherein the housing is configured to rotate about an axis through the pivot in response to rotation of the adjustment handle.

In some embodiments, a header of a harvester includes a frame and a crop divider configured to separate rows of crops. In an embodiment, the crop divider includes a housing including an interior cavity and an adjustment assembly disposed within the interior cavity of the housing, wherein the adjustment assembly is configured to rotate the crop divider relative to the frame. In an embodiment, the adjustment assembly includes an adjustment handle configured to rotate relative to the housing and a pivot disposed vertically above the adjustment handle within the interior cavity of the housing, wherein the housing is configured to rotate about an axis through the pivot in response to rotation of the adjustment handle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from a remainder of the crop. For example, a harvester may cut crops within a field via a header. The header may also gather the cut crops into a processing system of the harvester for further processing. The processing system may include a threshing machine configured to thresh the cut crops, thereby separating the cut crops into certain desired agricultural materials, such as grain, and material other than grain (MOG). The desired agricultural materials may be sifted and then accumulated into a tank. When the tank fills to capacity, the desired agricultural materials may be collected from the tank. The MOG may then be discarded from the harvester (e.g., via a spreader).

The header may cut crops from the field that are encompassed within a width of the header. The header may include a cutter bar assembly that extends along at least a portion of the width of the header, and the cutter bar assembly may use blades to cut the crops. The header may include crop dividers on lateral ends of the header. The crop dividers may include a pointed end along a direction of travel of the header that separates rows of crops and funnels crops between the crop dividers toward the cutter bar assembly. Ground irregularity, crop conditions, and/or field conditions may make adjustable crop dividers desirable for the header.

Figure 1:
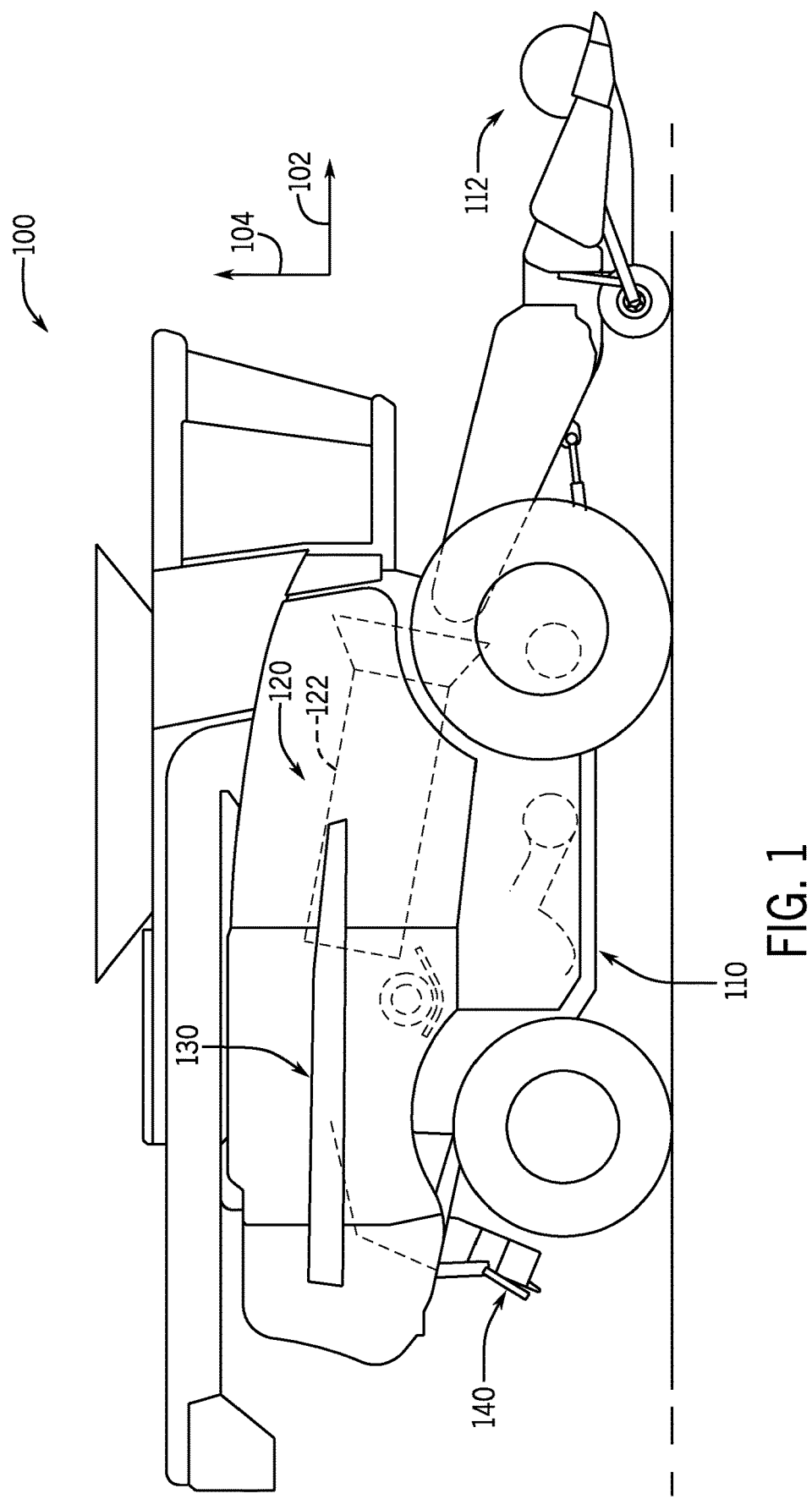
FIG. 1 is a side view of an embodiment of a harvester having a header, in accordance with an aspect of the present disclosure.

With the foregoing in mind, the present embodiments relating to an adjustable crop divider may be utilized within any suitable harvesting system. For example, FIG. 1 is a side view of an embodiment of a harvester 100 (e.g., agricultural harvester) having a header 112. To facilitate discussion, the harvester 100 and certain components of the harvester 100 may be described with reference to a longitudinal axis or direction 102 and a vertical axis or direction 104. The harvester 100 includes a chassis 110 configured to support the header 112 and an agricultural crop processing system 120. As described in greater detail below, the header 112 is configured to cut crops and to transport the cut crops toward an inlet of the agricultural crop processing system 120 for further processing of the cut crops. The agricultural crop processing system 120 receives the cut crops from the header 112 and separates desired crop material from crop residue. As an example, the agricultural crop processing system 120 may include a thresher 122 having a cylindrical threshing rotor that transports the crops in a helical flow path through the harvester 100. In addition to transporting the crops, the thresher 122 may also separate certain desired crop material (e.g., grain) from the crop residue, such as husks and pods, and may enable the desired crop material to flow into a cleaning system located beneath the thresher 122. The cleaning system may remove debris from the desired crop material and may transport the desired crop material to a storage compartment within the harvester 100. The crop residue may be transported from the thresher 122 to a crop residue handling system 130, which may remove the crop residue from the harvester 100 via a crop residue spreading system 140 positioned at the aft end of the harvester 100.

Figure 2:
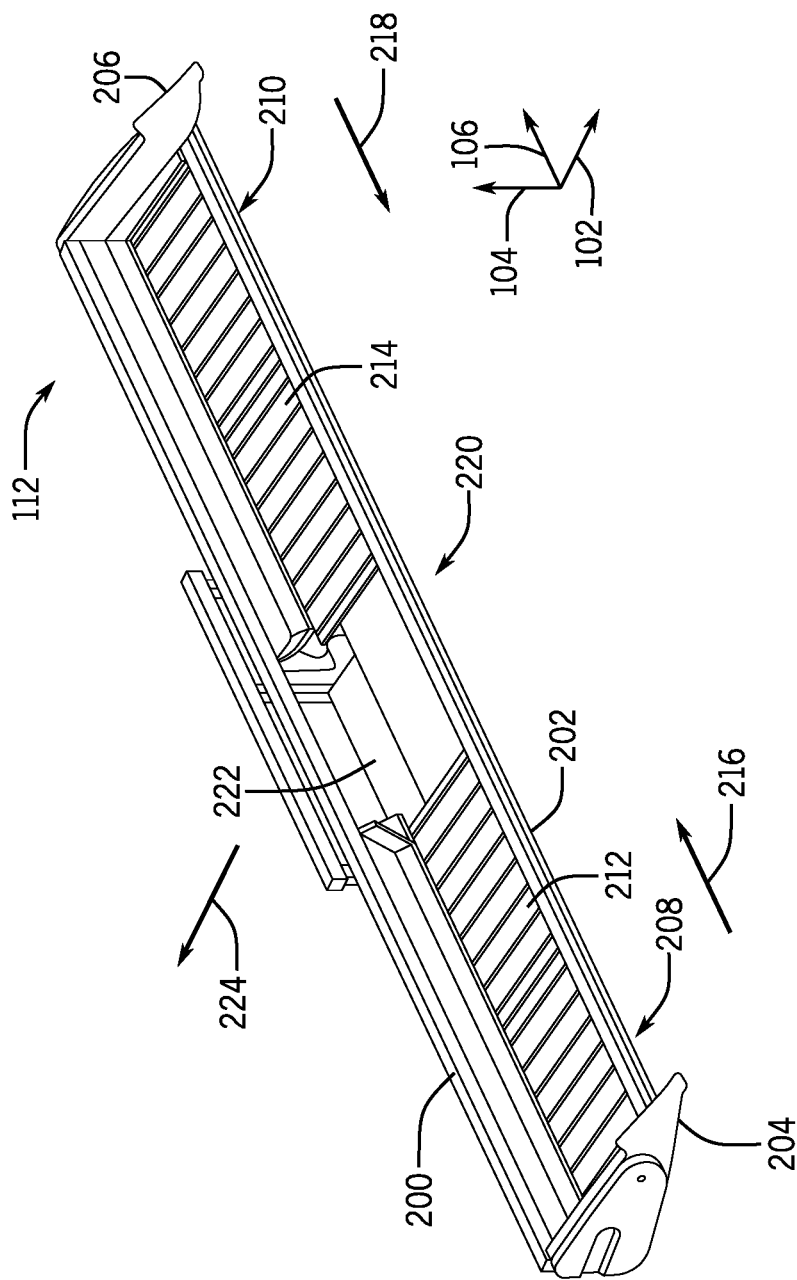
FIG. 2 is a top perspective view of an embodiment of a header that may be used within the harvester of FIG. 1, in accordance with an aspect of the present disclosure.

FIG. 2 is a top perspective view of an embodiment of the header 112 that may be employed within the harvester of FIG. 1. To facilitate discussion, the header 112 and certain components of the header 112 may be described with reference to the longitudinal axis or direction 102, the vertical axis or direction 104, and a lateral axis or direction 106. A direction of travel of the header 112 may be in a same direction as the longitudinal direction 102. The header 112 includes a frame 200 that may be removably coupled to the chassis of the harvester. The header 112 also includes a cutter bar assembly 202 that extends along the lateral axis 106 between a first crop divider 204 and a second crop divider 206. In some embodiments, the first crop divider 204 and the second crop divider 206 may be configured to move (e.g., pivot) relative to the frame 200 of the header 112 via toolless adjustment and/or in response to contact with a field (e.g., ground; objects in the field, such as rocks) as the header 112 travels through the field.

When the harvester is in operation, blades of the cutter bar assembly 202 may engage and cut a portion of crops. The cut portion of the crops may engage a first side draper deck 208, a second side draper deck 210, and an infeed draper deck 220 (e.g., a reel assembly may drive the cut crops toward the decks 208, 210, 220). The first side draper deck 208 includes a first side conveyor 212, and the second side draper deck 210 includes a second side conveyor 214. The first side conveyor 212 extends along the lateral axis 106 and moves crops generally in a first laterally inward direction 216. The second side conveyor 214 extends along the lateral axis 106 and moves crops generally in a second laterally inward direction 218. In certain embodiments, side decks (e.g., the first side draper deck 208 and the second side draper deck 210) and/or an infeed deck (e.g., the infeed draper deck 220) of the header 112 may include other configurations such that the conveyors are omitted. For example, the side decks and/or the infeed deck may include augers that may move the crops.

In certain embodiments, the first side draper deck 208 and the second side draper deck 210 include arm assemblies that extend through the first side conveyor and the second side conveyor, respectively. The arm assemblies are coupled to the cutter bar assembly 202 at first ends (e.g., forward end) and are coupled to biasing members (e.g., fluid-filled biasing members, airbags) at second ends (e.g., rearward ends). The arm assemblies are also pivotally coupled to the frame 200 generally between the first ends and the second ends. The pivotal coupling between the arms and the frame 200 enables the cutter bar assembly 202 to flex during operation of the header 112. For example, the biasing members provide a downward force on the second ends of the arms that drives the first ends of the arms and the cutter bar assembly 202 upwardly. As such, the biasing members control the contact force between the cutter bar assembly 202 and the ground and enable the cutter bar assembly 202 to flex and to follow contours of the ground.

The infeed draper deck 220 is disposed between the first side draper deck 208 and the second side draper deck 210 along the lateral axis 106. As illustrated, the infeed draper deck 220 extends along the longitudinal axis 102. The infeed draper deck 220 includes an infeed conveyor 222. As each of the first side draper deck 208 and the second side draper deck 210 receive the cut portion of the crops, the first side conveyor 212 of the first side draper deck 208 and the second side conveyor 214 of the second side draper deck 210 move the cut portion of the crops toward the infeed draper deck 220 in the first laterally inward direction 216 and in the second laterally inward direction 218, respectively. The infeed draper deck 220 also receives the cut portion of the crops from the cutter bar assembly 202. The infeed conveyor 222 of the infeed draper deck 220 moves the cut portion of the crops in a longitudinally rearward direction 224 toward the agricultural crop processing system.

As illustrated, the header 112 includes wheels configured to support the frame 200 in certain operating conditions. As the header 112 traverses the field, the cutter bar assembly 202 may flex. For example, the cutter bar assembly 202 may flex to generally match a contour of the field surface (e.g., the ground). The ability of the cutter bar assembly 202 to flex enables the harvester to precisely cut the crops at a target height, thereby increasing crop yields while harvesting.

Figure 3:
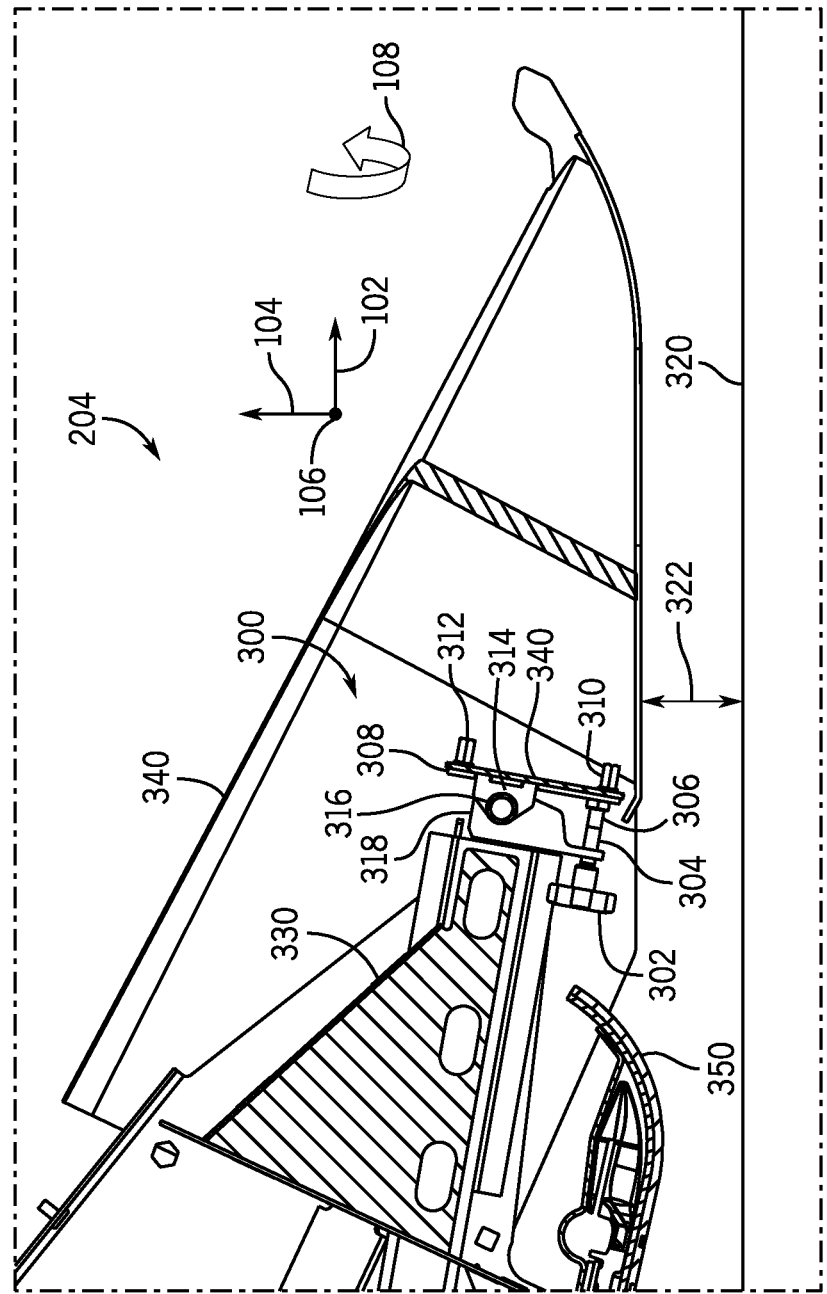
FIG. 3 is a cross-sectional side view of an embodiment of a crop divider of the header of FIG. 2, in accordance with an aspect of the present disclosure.

FIG. 3 is a cross-sectional side view of the first crop divider 204 of the header of FIG. 2. The first crop divider 204 includes an adjustment assembly 300 that couples (e.g., movably couples, pivotally couples) a frame portion 330 of the frame of the header to a housing 340 of the first crop divider 204. As shown, the housing 340 of the first crop divider 204 is positioned laterally outwardly of and extends forward of a blade 350 of the cutter bar assembly. To better illustrate components of the first crop divider 204, a laterally-inner portion of the housing 340 is omitted in FIG. 3. As illustrated, the adjustment assembly 300 includes an adjustment handle 302, a threaded rod 304, a rod head 306, a first plate 308, a first fastener 310 (e.g., threaded fastener, such as a bolt; weld; adhesive), a second fastener 312 (e.g., threaded fastener, such as a bolt; weld; adhesive), a second plate 314 (e.g., bracket), and a pivot 316 (e.g., pin). The adjustment assembly 300 may enable pivoting of the housing 340 of the first crop divider 204 relative to the frame portion 330. That is, the first plate 308, the first fastener 310, the second fastener 312, the second plate 314, and the housing 340 may pivot in a first rotational direction 108 (e.g., upwardly) relative to the adjustment handle 302, the threaded rod 304, the rod head 306, and the frame portion 330, such as in response to the housing 340 contacting the field (e.g., the ground; an object, such as a rock) as the header travels through the field. In this way, the housing 340 may generally follow the contour of the field as the header travels though the field. However, the adjustment assembly 300 may also establish a set point (e.g., limit position), such that the housing 340 may pivot in the first rotational direction 108 from the set point and is blocked from pivoting from the set point in a second rotational direction (e.g., downwardly) that is opposite to the first rotational direction 108. The user may want to establish the set point as a default or resting position relative to the ground (e.g., in the absence of an external upward force on the housing 240, such as in the absence of contact with the ground or the object in the field). For example, a lower set position may enable the first crop divider 204 to pass closer to the ground and guide more crops toward the cutter bar assembly, while a higher set position may reduce a number of contacts between the first crop divider 204 and the ground or objects in the field.

The adjustment assembly 300 may be disposed within an interior cavity of the housing 340. That is, the adjustment handle 302, the threaded rod 304, the rod head 306, the first plate 308, the first fastener 310, the second fastener 312, the second plate 314, and the pivot 316 may be disposed within an interior cavity of the housing 340. The housing 340 may protect the components of the adjustment assembly 300 from weather, dust, dirt, and/or crop material, for example. The adjustment handle 302 may be coupled (e.g., fixed, non-rotatably coupled; welded; integrally-formed) to the threaded rod 304 at a first end of the threaded rod 304. The adjustment handle 302 may be formed of any suitable material, such as a plastic material or a metal (e.g., metal or metal alloy) material. The threaded rod 304 may be formed of any suitable materials, such as a metal material. The adjustment handle 302 may be configured to enable a user to grip (e.g., with a hand of the user) and turn the adjustment handle 302, which drives rotation of the threaded rod 304.

As discussed in more detail below, the rotation of the threaded rod 304 causes the threaded rod 304 to move (e.g., linearly; generally along the longitudinal axis 102) relative to the frame portion 330. The threaded rod 304 thus exerts a force (e.g., pushes, drives) the first plate 308, which is coupled (e.g., fixed, non-rotatably coupled via the first and second fasteners 310, 312) to the housing 340. The force on the first plate 308 thus drives the housing 340 of the first crop divider 204 to pivot in the first rotational direction 108 relative to the frame portion 330 to establish the set point for the housing 340. In this way, the user may toollessly (e.g., using their hand to turn the adjustment handle 102) adjust the housing 340 relative to the frame portion 300 and may establish the set point for the housing 340. Once the set point for the housing 340 is established in this way, the housing 340 may still further pivot from the set point in the first rotational direction 108 as the header travels through the field, but may not pivot from the set point in the second rotational direction that is opposite the first rotational direction 108.

In some embodiments, the threaded rod 304 may have a rod head 306 formed at a second end of the threaded rod 304. The second end may be opposite of the first end of the threaded rod 304 and may be disposed generally in the longitudinal direction 102 from the first end of the threaded rod 304. The rod head 306 may be formed of any suitable material, such as a plastic material or a metal material. However, it may be desirable for the rod head 306 to be formed of the plastic material, as this may reduce wear on the first plate 308 due to contact between the rod head 306 and the first plate 308. In some embodiments, the rod head 306 may be a separate piece (e.g., cap) that is coupled (e.g., via threads, welds, adhesive) to the threaded rod 304 or the rod head 306 may be integrally-formed with the threaded rod 304 (e.g., one-piece). The rod head 306 may extend radially-outwardly from the threaded rod 304. In such cases, a surface area (e.g., of an end surface that contacts the first plate 308) of the rod head 306 is greater than a surface area of the threaded rod 304, which may also reduce wear on the first plate 308. In certain embodiments, the rod head 306 may form a rounded end of the threaded rod 304. For example, the rod head 306 may have a hemispherical shape, and a curved surface of the rod head 306 may extend toward and contact the first plate 308. Thus, the threaded rod 304, via the rod head 306, may contact and may push against the first plate 308. The first plate 308 may be coupled to the housing 340 (e.g., fixed, non-rotatably coupled by fasteners, such as the first and second fasteners 310, 312). The first plate 308 may also be coupled (e.g., fixed, non-rotatably coupled by fasteners or welds) to the second plate 314. It should be appreciated that these components may be coupled to one another in any of a variety of manners. For example, in certain embodiments, the first plate 308 may be welded to the housing 340, the first plate 308 may be integrally-formed with the housing 340, and/or the first plate 308 may be integrally-formed with the second plate 314. As shown, the second plate 314 extends (e.g., rearwardly along the longitudinal axis 102; toward the adjustment handle; toward the frame portion 330) from the first plate 308. Furthermore, the attachment assembly 300 may include any number of additional plates or components between the first plate 308 and the housing 340 to couple the first plate 308 to the housing 340. Additionally, the portion of the housing 340 that is shown adjacent to and fastened to the first plate 308 may have any suitable shape or form and is generally intended to represent a component of the housing 340 or a component that is fixed relative to the housing 340. For example, the portion of the housing 340 that is shown adjacent to and fastened to the first plate 308 may be an additional plate that is welded to the housing 340.

In certain embodiments, a third plate 318 (e.g., bracket) may be coupled (e.g., fixed, non-rotatably coupled by fasteners or welds) to the portion of the frame 330. The second plate 314 may be disposed forward along the longitudinal direction 102 from the third plate 318. The second plate 314 may be movably coupled to the third plate 318. For example, the pivot 316 may pivotally couple the second plate 314 to the third plate 318. The second plate 314 may rotate relative to the third plate 318 and the portion of the frame 330 about an axis through the pivot 316 that extends in the lateral direction 106. The pivot 316 may be disposed above, in the vertical direction 104, the adjustment handle 302 and the threaded rod 304. The housing 340 of the first crop divider 204 may rotate about the pivot 316 to adjust a height 322 of the housing 340 of the first crop divider 204 relative to the ground 320. In certain embodiments, the housing 340 of the first crop divider 204 may be free to pivot relative to the header frame 330 in the first rotational direction 108 (e.g., upwardly away from the ground 320). The housing 340 of the first crop divider 204 may be blocked from pivoting relative to the header frame 330 in the second rotational direction opposite of the first rotational direction 108 due to contact between the first plate 308 and the rod head 306.

Figure 4:
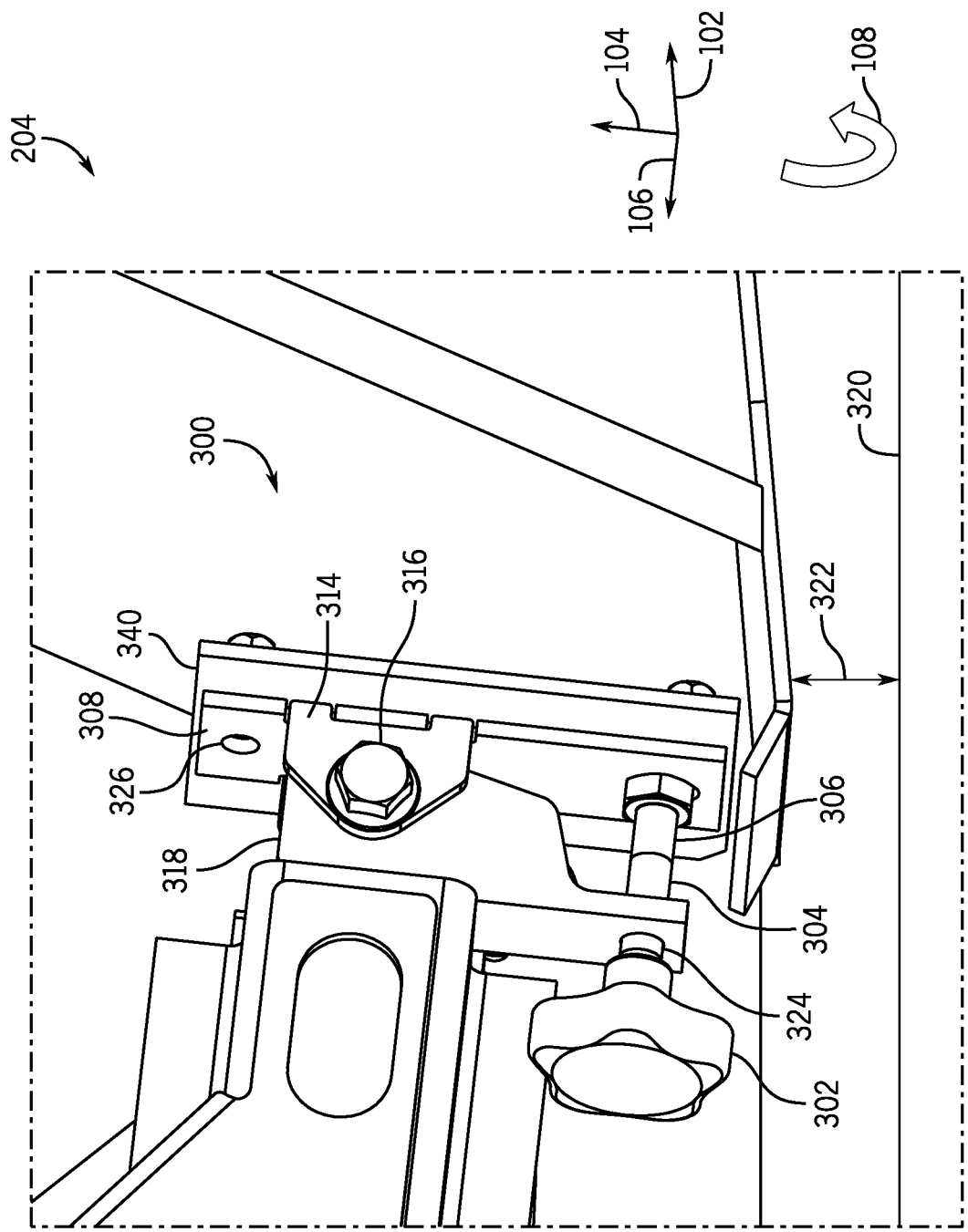
FIG. 4 is a rear perspective view of an embodiment of a portion of the crop divider of FIG. 3, in accordance with an aspect of the present disclosure.

FIG. 4 is a rear perspective view of a portion of the first crop divider 204. In some embodiments, the third plate 318 may include an aperture 324 (e.g., through-hole) to receive the threaded rod 304. The threaded rod 304 may be disposed through the aperture 324 of the third plate 318. The threaded rod 304 may be movably coupled to the third plate 318 and may be movably disposed in the aperture 324 of the third plate 318. In certain embodiments, the aperture 324 may be oppositely threaded to the threaded rod 304, and engagement between respective threads of a radially-inner surface of the aperture 324 and respective threads of a radially-outer surface of the threaded rod 304 (e.g., threaded interface) enables the threaded rod 304 to move linearly through the aperture 324 due to rotation of the threaded rod 304 as a user turns the adjustment handle 302. In certain embodiments, the adjustment handle 302 may be a star-shaped handle and may have peaks and valleys disposed about a circumference of the adjustment handle 302. The valleys may receive a user's fingers and may enable the user to grip and turn the adjustment handle 302 to adjust the height 322 of the housing 340 of the first crop divider 204 above the ground 320. The adjustment handle 302 may enable a user to adjust the height of the first crop divider 204 relative to the ground 320 without the use of a separate tool (e.g., wrench).

In certain embodiments, the first plate 308 may include an aperture 326 to receive the second fastener. The first plate 308 may include a second aperture to receive the first fastener. The first and second fasteners may couple the first plate 308 to the housing 340. In certain embodiments, the first plate 308 may include a contact pad that contacts the second end of the threaded rod 304 (e.g., the rod head 306). In some embodiments, the contact pad may have a wedge shape (e.g., tapered surface with a bottom, laterally-extending edge that is further from a rear-ward facing surface of the first plate 308 and a top, laterally-extending edge that is closer to the rearward-facing surface first plate 308) and may be formed of a plastic material to reduce wear on the threaded rod 304 or the rod head 306. The wedge shape may help maintain contact between the second end of the threaded rod and the contact pad across multiple different set points (e.g., as the housing 340 pivots relative to the frame portion 330).

Figure 5:
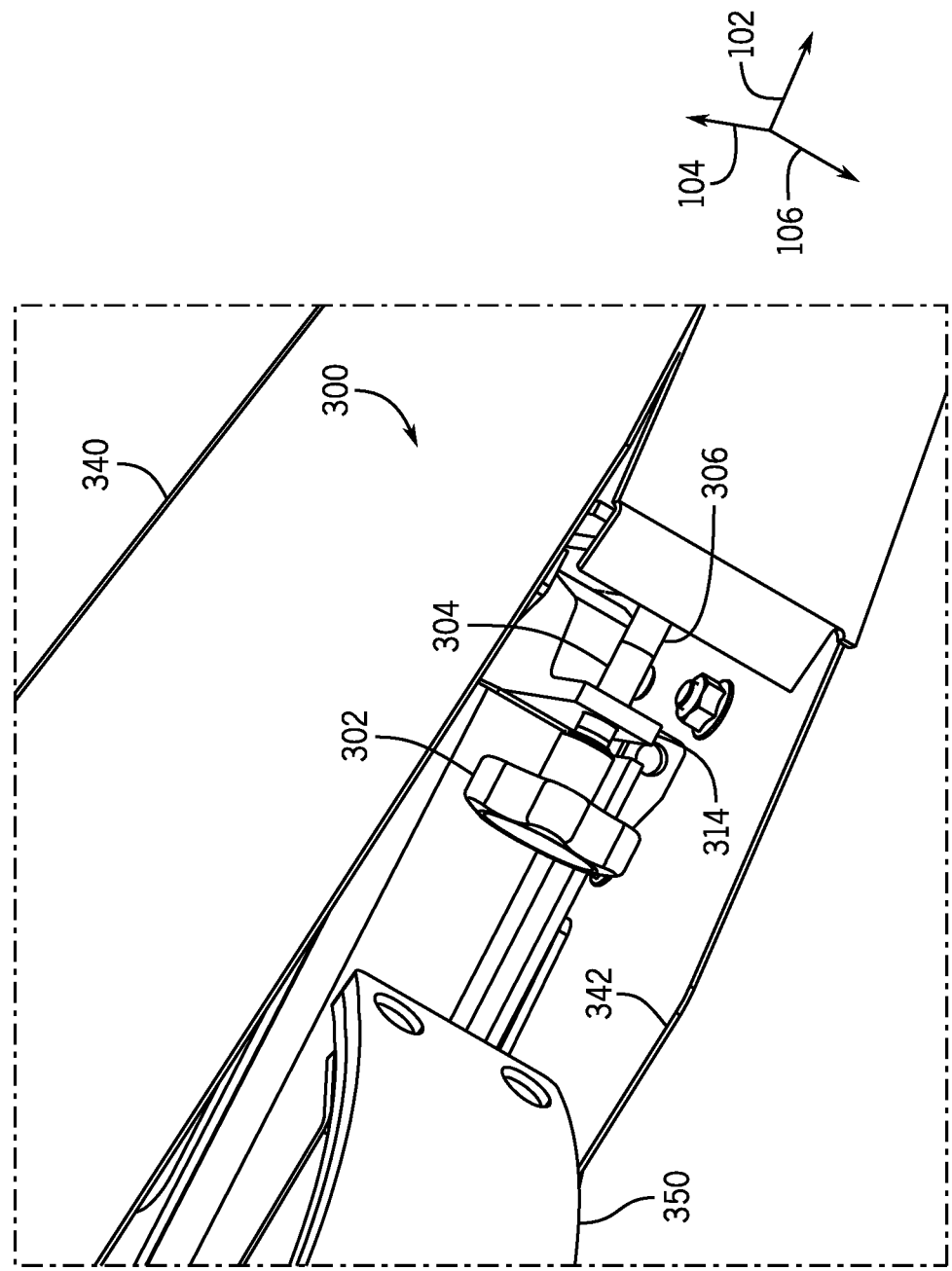
FIG. 5 is a bottom perspective view of an embodiment of a portion of the crop divider of FIG. 3, in accordance with an aspect of the present disclosure.

FIG. 5 is a bottom perspective view of a portion of the first crop divider 204. In certain embodiments, the housing 340 includes an opening 342 formed through a portion of the housing 340. In some embodiments, the opening 342 may be formed through a portion of the housing 340 below the adjustment assembly 300. For example, the opening 342 may be formed through a portion of the housing 340 positioned below (e.g., in the vertical direction 104) the adjustment handle 302. In some embodiments, the adjustment assembly 300 (or at least the adjustment handle 302 of the adjustment assembly 300) may be positioned forward of the blade 350 of the cutter bar assembly, between laterally-outer walls of the housing 340, and/or rearward of a bottom wall of the housing 340 (e.g., that extends laterally between the laterally-outer walls of the housing 340). To facilitate access to the adjustment assembly 300, the opening 342 may also be positioned forward of the blade of the cutter bar assembly, between the laterally-outer walls of the housing 340, and/or rearward of the bottom wall of the housing 340. The opening 342 may enable user access to the adjustment assembly 300. For example, a user may grasp the adjustment handle 302 by reaching through the opening 342 and may turn the adjustment handle 302 to alter a height of the housing 340 relative to the ground 320.

As illustrated, the adjustment handle 302 may be positioned below the pivot 316 (e.g., along the vertical axis 104, relative to the ground) and rearward of the threaded rod 304 (e.g., along the longitudinal axis 102). However, it should be appreciated that the components may be arranged in other ways to carry out the disclosed techniques for adjusting the housing 340 of the first crop divider 204. For example, the components may be arranged to enable the adjustment handle 302 to be positioned above the pivot 316 and to enable the user to access the adjustment handle 302 through an opening positioned above the adjustment handle 302. As another example, the components may be arranged to enable the adjustment handle 302 to be positioned forward of the threaded rod 304. In such cases, the threaded rod 304 may extend through the first plate 308 and may exert a force against the third plate 318 to adjust the housing 340 of the first crop divider 204. While the first crop divider 204 is shown and described in detail, it should be appreciated that the second crop divider 206 may include the same features.

Figure 6:
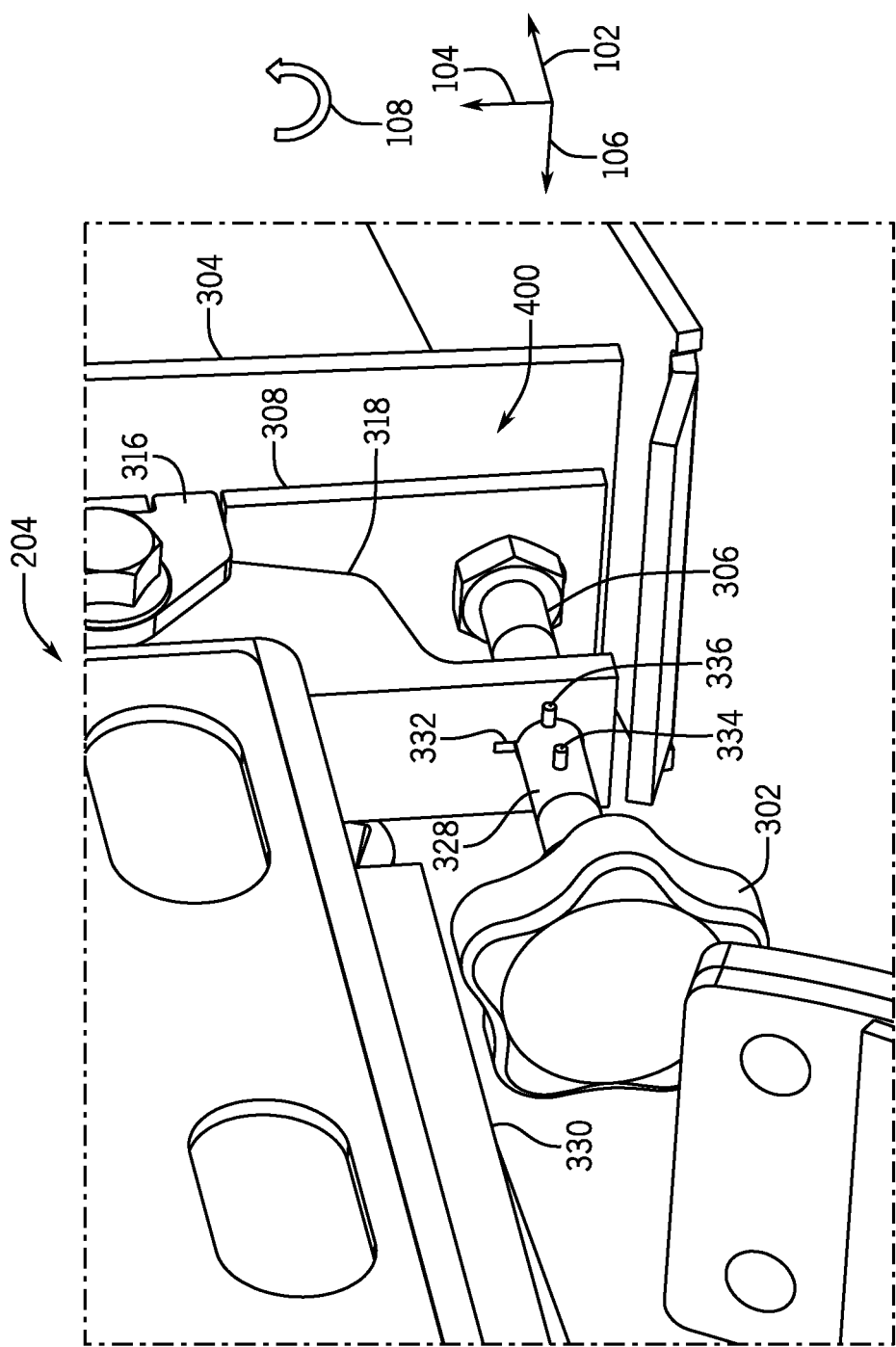
FIG. 6 is a rear perspective view of another embodiment of a portion of a crop divider of the header of FIG. 2, in accordance with an aspect of the present disclosure.

FIG. 6 is a cross-sectional side view of another embodiment of a portion of the first crop divider 204 of the header of FIG. 2. In certain embodiments, an adjustment assembly 400 includes a rod 328, an aperture 332 on the third plate 318, a first pin 334, and a second pin 336. The adjustment assembly 400 may enable pivoting of the housing 340 of the first crop divider 204 relative to the frame portion 330. That is, the first plate 308 and the housing 340 may pivot in a first rotational direction 108 (e.g., upwardly) relative to the adjustment handle 302, the rod 328, the rod head 306, the first pin 334, the second pin 336, and the frame portion 330, such as in response to the housing 340 contacting the field (e.g., the ground; an object, such as a rock) as the header travels through the field. In this way, the housing 340 may generally follow the contour of the field as the header travels though the field. However, the adjustment assembly 400 may also establish a set point (e.g., limit position), such that the housing 340 may pivot in the first rotational direction 108 from the set point and is blocked from pivoting from the set point in a second rotational direction (e.g., downwardly) that is opposite to the first rotational direction 108. The user may want to establish the set point as a default or resting position relative to the ground (e.g., in the absence of an external upward force on the housing 240, such as in the absence of contact with the ground or the object in the field). For example, a lower set position may enable the first crop divider 204 to pass closer to the ground and guide more crops toward the cutter bar assembly, while a higher set position may reduce a number of contacts between the first crop divider 204 and the ground or objects in the field.

The adjustment assembly 400 may be disposed within an interior cavity of the housing 340. That is, the adjustment handle 302, the rod 328, the rod head 306, the first pin 334, and the second pin 336 may be disposed within an interior cavity of the housing 340. The housing 340 may protect the components of the adjustment assembly 400 from weather, dust, dirt, and/or crop material, for example. The adjustment handle 302 may be coupled (e.g., fixed, non-rotatably coupled; welded; integrally-formed) to the rod 328 at a first end of the rod 328. The rod 328 may be formed of any suitable materials, such as a metal material. The adjustment handle 302 may be configured to enable a user to grip (e.g., with a hand of the user), turn, and push the adjustment handle 302, which drives the rod 328 through the aperture 332 on the third plate 318.

As discussed in more detail below, the rod 328 moves (e.g., linearly; generally along the longitudinal axis 102) relative to the frame portion 330. The rod 328 thus exerts a force (e.g., pushes, drives) on the first plate 308, which is coupled (e.g., fixed, non-rotatably coupled via fasteners) to the housing 340. The force on the first plate 308 drives thus the housing 340 of the first crop divider 204 to pivot in the first rotational direction 108 relative to the frame portion 330 to establish the set point for the housing 340. In this way, the user may toollessly (e.g., using their hand to turn the adjustment handle 102) adjust the housing 340 relative to the frame portion 300 and may establish the set point for the housing 340. Once the set point for the housing 340 is established in this way, the housing 340 may still further pivot from the set point in the first rotational direction 108 as the header travels through the field, but may not pivot from the set point in the second rotational direction that is opposite the first rotational direction 108.

In some embodiments, the rod 328 may have a rod head 306 formed at a second end of the rod 328. The second end may be opposite of the first end of the rod 328 and may be disposed generally in the longitudinal direction 102 from the first end of the rod 328. The rod head 306 may be formed of any suitable material, such as a plastic material or a metal material. However, it may be desirable for the rod head 306 to be formed of the plastic material, as this may reduce wear on the first plate 308 due to contact between the rod head 306 and the first plate 308. In some embodiments, the rod head 306 may be a separate piece (e.g., cap) that is coupled (e.g., via threads, welds, adhesive) to the rod 328 or the rod head 306 may be integrally-formed with the rod 328 (e.g., one-piece). The rod head 306 may extend radially-outwardly from the rod 328. In such cases, a surface area (e.g., of an end surface that contacts the first plate 308) of the rod head 306 is greater than a surface area of the rod 328, which may also reduce wear on the first plate 308. In certain embodiments, the rod head 306 may form a rounded end of the rod 328. For example, the rod head 306 may have a hemispherical shape, and a curved surface of the rod head 306 may extend toward and contact the first plate 308. Thus, the rod 328, via the rod head 306, may contact and may push against the first plate 308. The first plate 308 may be coupled to the housing 340 (e.g., fixed, non-rotatably coupled by fasteners).

The pivot 316 may be disposed above, in the vertical direction 104, the adjustment handle 302 and the rod 328. The housing 340 of the first crop divider 204 may rotate about the pivot 316 to adjust a height of the housing 340 of the first crop divider 204 relative to the ground. In certain embodiments, the housing 340 of the first crop divider 204 may be free to pivot relative to the header frame 330 in the first rotational direction 108 (e.g., upwardly away from the ground 320). The housing 340 of the first crop divider 204 may be blocked from pivoting relative to the header frame 330 in the second rotational direction opposite of the first rotational direction 108 due to contact between the first plate 308 and the rod head 306.

As shown, the rod 328 may include the first pin 334 and the second pin 336. The aperture 332 may be shaped to allow the first pin 334 and the second pin 336 to pass through while the rod 328 is a first rotational position in which the first pin 334 and the second pin 336 are aligned with the vertical axis 104 and to block the first pin 334 and the second pin 336 from passing through while the rod 328 is in a second rotational position in which the first pin 334 and the second pin 336 are not aligned with the vertical axis 104 (e.g., while aligned with the lateral axis 106). The first pin 334 and the second pin 336 may extend radially-outwardly from the rod 328 and may be spaced apart in the longitudinal direction 102 on the rod 328. For example, the first pin 334 and the second pin 336 may be spaced apart in the longitudinal direction 102 by a distance slightly greater (e.g., less than 1 centimeter) than a thickness of the third plate 318 in the longitudinal direction 102. Each pin on the rod 328 may provide a separate set point (e.g., limit position), such that the housing 340 may pivot in the first rotational direction 108 from the set point and is blocked from pivoting from the set point in a second rotational direction (e.g., downwardly) that is opposite to the first rotational direction 108. Additionally or alternatively, the rod 328 may include any number of pins (e.g., 2, 3, 4, 5, 6, or more pins) spaced apart in the longitudinal direction 102. Positioning the third plate 318 between any pair of adjacent pins on the rod 328 may provide a respective set point such that the housing 340 may be blocked from pivoting in the first rotational direction 108 from the set point and may be blocked from pivoting in the second rotational direction (e.g., downwardly) that is opposite to the first rotational direction 108.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A crop divider, comprising:
a housing comprising an interior cavity; and
an adjustment assembly disposed within the interior cavity of the housing, wherein the adjustment assembly is configured to adjust a height of the housing relative to ground, the adjustment assembly comprising:
an adjustment handle disposed within the interior cavity;
a pivot disposed vertically above the adjustment handle within the interior cavity of the housing, wherein the housing is configured to rotate about an axis through the pivot in response to rotation of the adjustment handle; and
a rod extending from the adjustment handle; and
a first plate coupled to the housing, wherein the rod is configured to contact the first plate to move the first plate to rotate about the axis through the pivot.

2. The crop divider of claim 1,
wherein the rod is a threaded rod extending from the adjustment handle; and
wherein the rod includes a rod head formed of a plastic material and coupled to the threaded rod at an opposite end of the threaded rod from the adjustment handle.

3. The crop divider of claim 1,
wherein the rod is a threaded rod extending from the adjustment handle.

4. The crop divider of claim 1, comprising a second plate and a third plate, wherein the second plate extends from the first plate toward the third plate, and the third plate is coupled to the second plate via the pivot and to a header frame.

5. The crop divider of claim 4, wherein the rod is a threaded rod that is disposed through an aperture of the third plate, and the threaded rod is movably coupled to the third plate.

6. The crop divider of claim 5, wherein the adjustment handle is configured to enable a user to turn the adjustment handle to move the threaded rod through the aperture.

7. The crop divider of claim 1, wherein the adjustment assembly is configured to block rotation of the housing in a first rotational direction.

8. The crop divider of claim 1, wherein the housing comprises an opening configured to enable a user to access the adjustment handle.

9. A header of a harvester, comprising:
a cutter bar assembly configured to cut crops along a field surface; and
a crop divider configured to funnel crops toward the cutter bar assembly, the crop divider comprising:
a housing comprising an interior cavity;
an adjustment handle disposed within the interior cavity and configured to rotate relative to the housing;
a pivot disposed vertically above the adjustment handle within the interior cavity of the housing, wherein the housing is configured to rotate about an axis through the pivot in response to rotation of the adjustment handle;
a rod extending from the adjustment handle; and
a first plate coupled to the housing, wherein the rod is configured to contact the first plate to move the first plate to rotate about the axis through the pivot.

10. The header of claim 9, wherein the rod is a threaded rod extending from the adjustment handle, wherein rotation of the adjustment handle is configured to cause the threaded rod to move in a longitudinal direction.

11. The header of claim 10, comprising a third plate non-rotatably coupled to a frame of the header and rotatably coupled to the first plate via the pivot, wherein the threaded rod extends through a threaded aperture formed in the third plate to contact the first plate.

12. The header of claim 10, comprising a rod head coupled to the threaded rod at an end opposite the adjustment handle, wherein the rod head comprises a respective diameter that is greater than a respective diameter of the threaded rod.

13. The header of claim 12, wherein the rod head has a hemispherical shape, and the rod head is formed of a plastic material.

14. A header of a harvester, comprising:
a frame;
a crop divider configured to separate rows of crops, the crop divider comprising:
a housing comprising an interior cavity;
an adjustment assembly disposed within the interior cavity of the housing, wherein the adjustment assembly is configured to rotate the crop divider relative to the frame, the adjustment assembly comprising:
an adjustment handle configured to rotate relative to the housing; and
a pivot disposed vertically above the adjustment handle within the interior cavity of the housing, wherein the housing is configured to rotate about an axis through the pivot in response to rotation of the adjustment handle;
a rod extending from the adjustment handle; and
a first plate coupled to the housing, wherein the rod is configured to contact the first plate to move the first plate to rotate about the axis through the pivot.

15. The header of claim 14,
wherein the rod is a threaded rod extending from the adjustment handle; and
the first plate is non-rotatably coupled to the housing, wherein the threaded rod is configured to contact the first plate and to drive the first plate and the housing coupled thereto to rotate about the axis through the pivot.

16. The header of claim 15, comprising a third plate non-rotatably coupled to the frame and rotatably coupled to the first plate via the pivot, wherein the third plate comprises an aperture that circumferentially surrounds and supports the threaded rod.

17. The header of claim 15, wherein the aperture comprises respective threads on a radially-inner surface of the aperture that are configured to engage respective threads on a radially-outer surface of the threaded rod, and the respective threads enable the rotation of the adjustment handle and the threaded rod coupled thereto to move the threaded rod linearly through the aperture.

18. The header of claim 15, comprising a rod head disposed at an end of the threaded rod and configured to contact the first plate, wherein the rod head is formed of a plastic material.

* * * * *